United States Patent
Zhou et al.

(10) Patent No.: US 9,537,556 B2
(45) Date of Patent: Jan. 3, 2017

(54) SYSTEMS AND METHODS FOR OPTIMIZED BEAMFORMING AND COMPRESSION FOR UPLINK MIMO CLOUD RADIO ACCESS NETWORKS

(71) Applicants: Huawei Technologies Canada Co., Ltd., Kanata (CA); The Governing Council of the University of Toronto, Toronto (CA)

(72) Inventors: Yuhan Zhou, Toronto (CA); Wei Yu, Toronto (CA); Mohammadhadi Baligh, Ottawa (CA)

(73) Assignees: Huawei Technologies Canada Co., Ltd., Kanata, ON (CA); The Governing Council of the University of Toronto, Toronto (CA)

( * ) Notice: Subject to any disclaimer, the term of this patent is extended or adjusted under 35 U.S.C. 154(b) by 0 days.

(21) Appl. No.: 14/794,684

(22) Filed: Jul. 8, 2015

(65) Prior Publication Data
US 2016/0013850 A1  Jan. 14, 2016

Related U.S. Application Data

(60) Provisional application No. 62/023,385, filed on Jul. 11, 2014, provisional application No. 62/106,639, filed on Jan. 22, 2015.

(51) Int. Cl.
*H04B 7/02* (2006.01)
*H04B 7/06* (2006.01)
(Continued)

(52) U.S. Cl.
CPC .......... *H04B 7/0617* (2013.01); *H04B 7/0404* (2013.01); *H04B 7/0413* (2013.01); *H04W 84/045* (2013.01)

(58) Field of Classification Search
CPC ... H04B 7/0617; H04B 7/0413; H04B 7/0404; H04B 7/0417; H04B 7/024; H04B 7/0465; H04B 7/0626; H04W 84/045; H04W 52/346
See application file for complete search history.

(56) References Cited

U.S. PATENT DOCUMENTS

| 8,811,144 B2 | 8/2014 | Chatterjee et al. |
| 2005/0101259 A1* | 5/2005 | Tong .................... H04B 7/0417 455/69 |

(Continued)

FOREIGN PATENT DOCUMENTS

| WO | 2013063750 A | 5/2013 |
| WO | 2013067463 A1 | 5/2013 |
| WO | 2013076004 A2 | 5/2013 |

OTHER PUBLICATIONS

Christensen, Soren Skovgaard, et al., "Weighted Sum-Rate Maximization using Weighted MMSE for MIMO-BC Beamforming Design," IEEE Transactions on Wireless Communications, vol. 7, No. 12, Dec. 2008, 8 pages.

(Continued)

*Primary Examiner* — Khanh C Tran
(74) *Attorney, Agent, or Firm* — Slater Matsil, LLP

(57) ABSTRACT

System and method embodiments are provided to optimize uplink multiple-input-multiple-output (MIMO) beamforming for uplink and compression for fronthaul links transmission in cloud radio access network (C-RANs). In an embodiment, cloud-computing based central processor (CP) obtains channel state information for a mobile device (MD) being served by a plurality of access points (APs) in a C-RAN, and generates a channel gain matrix in accordance with the channel state information. A weighted sum-rate maximization model is then established using the channel gain matrix in accordance with power constraints of transmission from (Continued)

the MD to the APs and capacity constraints of fronthaul links connecting the APs to the CP. The CP calculates a transmit beamforming vector for the MD and a quantization noise covariance matrix for the APs jointly by applying a weighted minimum-mean-square-error successive convex approximation algorithm, or separately by applying an approximation algorithm, to solve the weighted sum-rate maximization model.

22 Claims, 5 Drawing Sheets

(51) Int. Cl.
    *H04B 7/04*     (2006.01)
    *H04W 84/04*     (2009.01)

(56) References Cited

U.S. PATENT DOCUMENTS

| | | | |
|---|---|---|---|
| 2009/0080560 A1 | 3/2009 | Na et al. | |
| 2009/0168722 A1 | 7/2009 | Saifullah et al. | |
| 2010/0091907 A1 | 4/2010 | Noh et al. | |
| 2010/0279729 A1* | 11/2010 | Hui | H04B 7/024 455/522 |
| 2011/0268203 A1* | 11/2011 | Chockalingam | H04B 7/0413 375/260 |
| 2011/0305176 A1 | 12/2011 | Wentink | |
| 2012/0027117 A1* | 2/2012 | Khojastepour | H04B 7/0617 375/285 |
| 2013/0063750 A1 | 3/2013 | Osakabe et al. | |
| 2013/0067463 A1 | 3/2013 | Ito | |
| 2013/0191519 A1* | 7/2013 | Chang | G06F 9/5066 709/223 |
| 2014/0076004 A1 | 3/2014 | Lee | |
| 2014/0169409 A1 | 6/2014 | Ma et al. | |
| 2014/0293904 A1* | 10/2014 | Dai | H04B 7/024 370/329 |
| 2014/0328423 A1* | 11/2014 | Agee | H04B 7/0413 375/267 |
| 2015/0078186 A1* | 3/2015 | Lagen Morancho | H04B 7/024 370/252 |
| 2015/0146565 A1* | 5/2015 | Yu | H04W 24/10 370/253 |
| 2015/0146646 A1* | 5/2015 | Chen | H04W 52/346 370/329 |

OTHER PUBLICATIONS

Weiler, Richard J., et al., "Enabling 5G Backhaul and Access with Millimeter-Waves," 2014 Conference on Networks and Communications, Jun. 23-26, 2014, 5 pages.
International Search Report received in Application No. PCT/US2015/039764, mailed Sep. 29, 2015, 8 pages.
Coso, et al., "Distributed Compression for MIMO Coordinated Networks with a Backhaul Constraint," IEEE Transactions on Wireless Communications, vol. 8, No. 9, Septembe 2009, 12 pages.
Park, et al., "Robust and Efficient Distributed Compression for Cloud Radio Access Networks," IEEE Transactions on Vehicular Technology, vol. 62, No. 2, Feb. 2013, 12 pages.
Zhou, et al., "Optimized Backhaul Compression for Uplink Cloud Radio Access Network," IEEE Journal on Selected Areas in Communications, vol. 32, No. 6, Jun. 2014, 13 pages.
Zhou, et al., "Optimized Beamforming and Backhaul Compression for Uplink MIMO Cloud Radio Access Networks," Globecom 2014 Workshop, Date of Conference Dec. 8-12, 2014, 6 pages.

* cited by examiner

SYSTEMS AND METHODS FOR OPTIMIZED BEAMFORMING AND COMPRESSION FOR UPLINK MIMO CLOUD RADIO ACCESS NETWORKS

This application claims the benefit of U.S. Provisional Application No. 62/023,385 filed on Jul. 11, 2014 by Yuhan Zhou et al. and "Methods for Optimized Beamforming and Backhaul Compression for Uplink MIMO Cloud Radio Access Networks," which is hereby incorporated herein by reference as if reproduced in its entirety. This application also claims the benefit of U.S. Provisional Application No. 62/106,639 filed on Jan. 22, 2015 by Yuhan Zhou, et al. and entitled "System and Methods for Optimizing Front-haul Compression for Uplink-Multiple-Input-Multiple-Output (MIMO) Cloud Radio Access Networks (CRANs)."

TECHNICAL FIELD

The present invention relates to wireless communications and networking, and, in particular embodiments, to systems and methods for optimized beamforming and compression for uplink multiple-input-multiple-output (MIMO) cloud radio access networks.

BACKGROUND

To meet increasing demands of communications in wireless networks, for instance due to increase use of smartphones, tablets, and video streaming, advanced network architectures including heterogeneous radio access networks (RANs) are being developed. The heterogeneous RANs include various types of access points including macro-level access points such as base stations (BSs) as well as smaller coverage access points such as so-called small cells. In many architectures, inside the coverage area of macro-level access points are the nested smaller cells (e.g., Femto and Pico cells). This provides a wide network coverage area with an increased communication capacity to serve users where needed. One challenging issue to be addressed in heterogeneous networks is mitigating signal interference between access points within coverage areas. In the terminology of Long Term Evolution based networks, Access to as base stations that provide cellular coverage. Within cells, the signal interference caused by other access points is referred to as inter-cell interference. A cloud radio access network (C-RAN) is a RAN architecture that offloads at least some encoding/decoding functionalities of BSs to a cloud-computing based central processor (CP). The C-RAN architecture allows coordination and joint signal processing across multiple cells through corresponding links between the BSs and the CP, also referred to as fronthaul links. However, there is a need for efficient schemes that can take advantage of the C-RAN architecture to improve overall communications performance and mitigate the inter-cell interference between the cells.

SUMMARY OF THE INVENTION

In accordance with an embodiment, a method for determining a transmit beamformer and a quantization noise covariance matrix for uplink multiple-input-multiple-output (MIMO) communications in a cloud radio access network (C-RAN) includes obtaining, by a central processor (CP), channel state information for a mobile device (MD) being served by a plurality of base stations (BSs) in the C-RAN, and generating a channel gain matrix in accordance with the channel state information. The method further includes establishing a weighted sum-rate maximization model using the channel gain matrix in accordance with power constraints of transmission from the MD to the BSs and capacity constraints of fronthaul links between the BSs and the CP, and calculating jointly a transmit beamforming vector for the MD and a quantization noise covariance matrix for the BSs by applying a weighted minimum-mean-square-error successive convex approximation (WMMSE-SCA) algorithm to solve the weighted sum-rate maximization model.

In accordance with another embodiment, a method for determining a transmit beamformer and a quantization noise covariance matrix for MIMO communications in a C-RAN includes obtaining, by a CP, channel state information for a MD being served by a plurality of BSs in the C-RAN, and generating a channel gain matrix in accordance with the channel state information. A weighted sum-rate maximization model is then established using the channel gain matrix in accordance with power constraints of transmission from the MD and capacity constraints of fronthaul links between the BSs and the CP. The method further includes calculating separately a transmit beamforming vector for the MD and a quantization noise covariance matrix for the BSs by applying an approximation algorithm to solve the weighted sum-rate maximization model.

In accordance with another embodiment, a network component for determining a transmit beamformer and a quantization noise covariance matrix for MIMO communications in a C-RAN comprises a processor and a non-transitory computer readable storage medium storing programming for execution by the processor. The programming includes instructions to obtain channel state information for a MD being served by a plurality of BSs in the C-RAN, and generate a channel gain matrix in accordance with the channel state information. The programming includes further instructions to establish a weighted sum-rate maximization model using the channel gain matrix in accordance with power constraints of transmission from the MD to the BSs and capacity constraints of fronthaul links between the BSs and the network component, and calculate jointly a transmit beamforming vector for the MD and a quantization noise covariance matrix for the BSs by applying a WMMSE-SCA algorithm to solve the weighted sum-rate maximization model.

In accordance with another embodiment, a network component for determining a transmit beamformer and a quantization noise covariance matrix for MIMO communications in a C-RAN comprises a processor and a non-transitory computer readable storage medium storing programming for execution by the processor. The programming includes instructions to obtain channel state information for a MD being served by a plurality of BSs in the C-RAN, and generate a channel gain matrix in accordance with the channel state information. The programming includes further instructions to establish a weighted sum-rate maximization model using the channel gain matrix in accordance with power constraints of transmission from the MD and capacity constraints of fronthaul links between the BSs and the network component, and calculate separately a transmit beamforming vector for the MD and a quantization noise covariance matrix for the BSs by applying an approximation algorithm to solve the weighted sum-rate maximization model.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
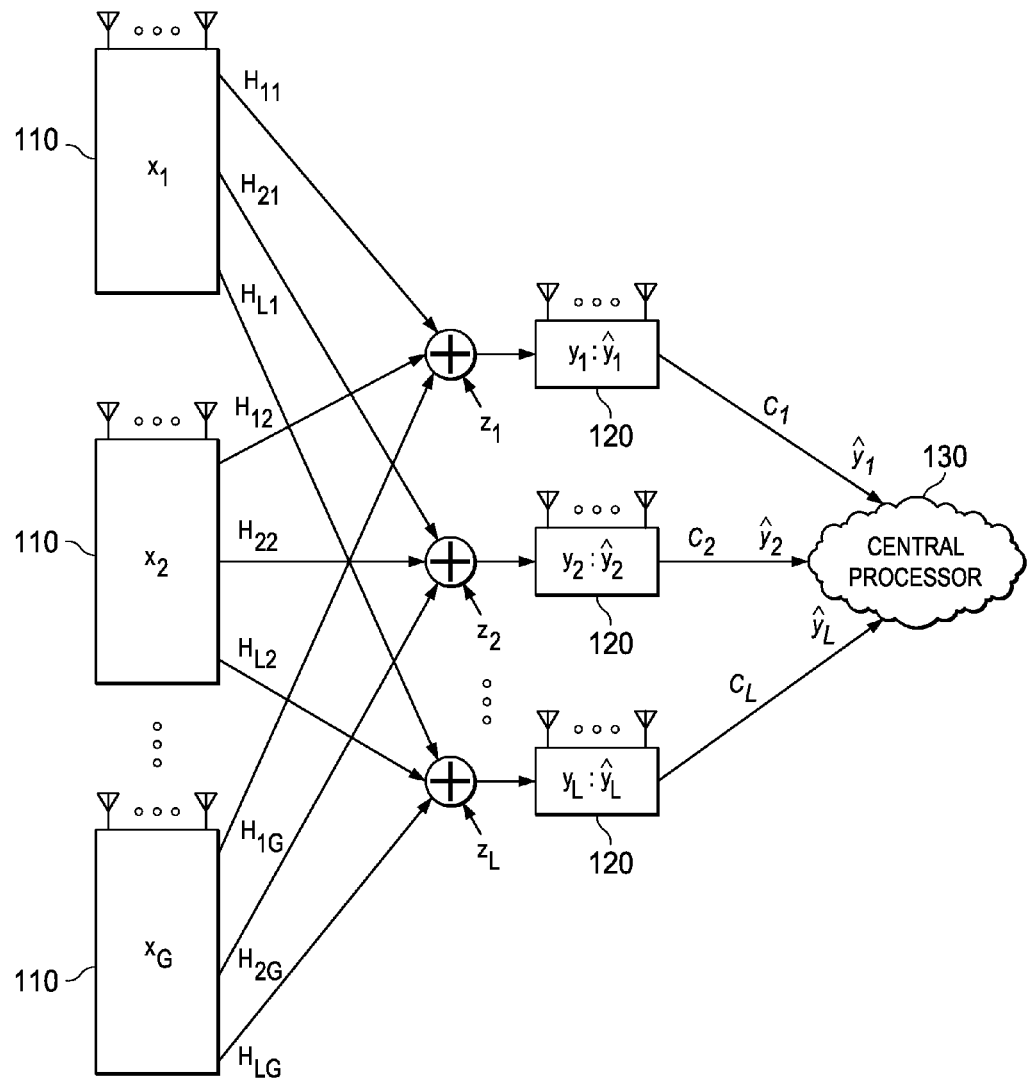
FIG. 1 is a diagram of an uplink multiple-input-multiple-output (MIMO) C-RAN architecture.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein to optimize MIMO beamforming for uplink and compression for fronthaul links transmission in C-RANs. The optimizing process improves overall communications performance on uplink, which can include cancelling or mitigating inter-cell interference. In the MIMO C-RAN, multi-antenna mobile devices (MD), also referred to as user terminals, user equipment (UEs), and machine-to-machine (M2M) devices, communicate with multi-antenna APs that serve as access nodes between the MDs and a network. It should be understood that a mobile device is a device that can connect to a mobile network, such as a RAN (or C-RAN). The mobile device itself need not be mobile and may be fixed in location. The BSs are connected to a cloud-computing-based CP through respective fronthaul links with certain capacity. An AP generically refers to a node through which a mobile device can obtain access to the RAN. In some deployments, an AP may be a Transmit Point (a node that only serves to transmit data towards the MD), or a Receive Point (a node that only serves to receive data transmitted from the MD), while in other situations, the AP functions like a conventional BS in that it serves to both send and receive data. In a C-RAN context, the BSs perform a compress-and-forward scheme to quantize the signals received from the MDs on uplink, and send the resulting quantized signals to the CP via the fronthaul links. The compressed signals received at the CP are then decoded.

Although referred to herein as being base stations, one skilled in the art will appreciate that the node could be either a Transmit Point (TP) or a Receive Point (RP). Futhermore, although the following discussion makes specific reference to a UE, any mobile device could be substituted, and the device need not fully comply with the $3^{rd}$ Generation Partnership Project definition of a UE.

The embodiment schemes for MIMO C-RAN uplink communications include optimizing the compression of received signals at the BSs (or RPs) and the beamforming of uplink MIMO transmissions from the UEs to the BSs. Optimizing the uplink beamforming of transmit signals from the UEs can reduce or cancel inter-cell interference in the C-RAN coverage area. Optimizing the compression of received signals at the CP can meet the limited capacity (e.g., bandwidth or frequency resource) of the fronthaul links between the BSs and the CP. This is achieved by optimizing the quantization noise covariance matrices of the BSs. The provided optimization schemes are performed by the CP.

In one optimization scheme, a weighted sum-rate maximization problem is formulated under UE power and fronthaul capacity constraints. A weighted minimum-mean-square-error successive convex approximation (WMMSE-SCA) algorithm is used for finding a local optimum solution to the problem. In another optimization scheme, a low-complexity approximation is used. The scheme performs beamforming by matching to the strongest channel vectors at the UE side. The scheme also separately performs per-antenna scalar quantizing with uniform quantization noise levels across the antennas at each BS. This approach is derived by exploring the structure of the optimal solution to the sum-rate maximization problem under successive interference cancellation (SIC), considering high signal-to-quantization-noise ratios (SQNRs). Simulation results show that the optimized beamforming and fronthaul compression schemes can significantly improve the overall performance of wireless communications in the network. In the SNQR regime of practical interest, the low-complexity scheme with SIC can perform close to the WMMSE-SCA scheme.

FIG. 1 shows an embodiment of a C-RAN architecture that supports MIMO communications between a plurality of UEs 110 and a plurality of BSs 120. The BSs 120 are connected to a cloud-computing based CP 130. Examples of the UEs 110 include smartphones, tablet/laptop computers, or any user operated devices capable of exchanging wireless communications with a network. The BSs 120 are access points that send and receive the UEs' wireless communications to and from the network. The BSs 120 may perform further processing on UE traffic, such as for encode/decode or compress/decompress operations. For example, the BSs 120 may be evolved node-Bs (eNBs) in Long Term Evolution (LTE) standard networks and smaller cells such as in heterogeneous networks. The CP 130 may be one or more processing components such as one or more servers in a cloud environment, e.g., the Internet. In other embodiments, the C-RAN may include any other types of MDs and APs that communicate with the CP 130. The MDs may include UEs, sensor devices, M2M devices, and/or other type of devices capable of exchanging wireless communications with the network. The APs may includes BSs and/or small cells (e.g., Femto or pico cells) that relay communications between the MDs and the CP 130 with no or simpler processing capability than the BSs. The wireless communications can include radio access network or cellular standard communications, WiFi standard communications, and/or other wireless technology standard communications.

The figure shows the flow of uplink communications from the UEs 110 to the BSs 120 and then to the CP 130. The UEs 110 and the BSs 120 communicate with each other on uplink using multiple antennas per each entity according to the MIMO scheme. The multiple MIMO antennas allow each UE 110 and BS 120 to transmit and/or receive multiple signals simultaneously with the other entity. The multiple signals can correspond to multiple communication channels between the two devices. A channel signal can also be split into multiple component signals to be sent by the multiple antennas. For example, a high-rate signal can be split into lower-rate signals transmitted by the multiple antennas at one end. At the receiver end, the lower-rate signals are received by multiple antennas and then combined to obtain the original signal.

The multiple antenna MIMO transmissions are realized by precoding the signals or signal components to establish a plurality of directed beams between the transmitting and receiving devices. The precoding process determines signal parameters, such as signal amplitudes, phases, and orientation angles, to direct multiple signal beams by the antennas. This process is also referred to as beamforming. The multiple beams are sent on multiple directions between the antennas of the transmitting device and the receiving device. As such, multiple signals can be transmitted simultaneously with controlled interference across the signals.

As the number of BSs 120 and UEs 110 increases, for instance in heterogeneous networks that make use of different sizes of access points, such as small cells (e.g., Femto or Pico cells), inter-cell interference becomes significant and further interference mitigation measures are needed. The inter-cell interference problem for uplink MIMO transmissions can be formulated considering the components of the C-RAN architecture. As shown in FIG. 1, the uplink of the C-RAN allows GUEs 110 to communicate with a CP 130 through L BSs 120 (G and L is an integer). The BSs 120 are considered to be connected to the CP 130 through corresponding noiseless fronthaul links of finite capacities $C_i$. One skilled in the art will appreciate that a fronthaul link can have noise, but that it is treated in the following discussion as being noiseless by assigning it a capacity at which transmissions can be made so that the noise is accounted for using error correction codes. Further, each UE 110 is equipped with M antennas, and each BS 120 is equipped with N antennas (where each of M and N is an integer). The number of antennas, M, at the UE 110 may be equal to or different than the number of antennas, N, at the BS 120. Channel state information (CSI) is made available to all the BSs 120 and to the CP 130. For instance, the CSI can be collected by the BS 120 and sent to the CP 130, or to a network controller that shares it with the CP 130.

The i-th BS 120 quantizes the received signal, then forwards the compressed bits to the CP 130 for decoding. At the CP side, the quantization codewords are first decoded, then the user messages are decoded sequentially. To model the uplink communications of the C-RAN system, a vector $H_{ik}$ is defined as the N×M complex channel matrix between the k-th UE 110 and the i-th BS 120. The channel matrix from the k-th UE 110 to all the BSs 120 is given as the NL×M matrix, $H_k = [H_{1k}^T, H_{2k}^T, \ldots, H_{Lk}^T]^T$. Each UE 110 may transmit d parallel data streams to the CP 130. The vector $V_k \in C^{M \times d}$ denotes the transmit beamforming vector (beamformer) that the k-th UE 110 utilizes to transmit signal $s_k \in C^{d \times 1}$ to the CP 130. Thus, the transmit signal at the k-th UE 110 is given by $x_k = V_k s_k$. The signal $y_i$ received at the the i-th BS 120, can be expressed as $$y_i = \sum_{k=1}^{G} H_{ik} V_k s_k + z_i,$$

for i=1, 2, ..., L, where $s_k \sim CN(0,I)$ is the intended signal vector for the k-th UE 110, and $z_i \sim CN(0, \sigma_i^2 I)$ represents the additive white Gaussian noise at the i-th BS 120. Further, each transmit beamformer vector should satisfy a per-user power constraint:

$$Tr(V_k V_k^H) \leq P_k \quad k=1, 2, \ldots, G. \tag{1}$$

When the linear minimum-mean-squared-error (MMSE) receive beamformer vector is applied at the CP 130, the transmission rate $(R_k)$ for the k-th UE 110 is given by:

$$R_k = \log |I + V_k^H H_k^H J_k^{-1} H_k V_k|, \text{ where} \tag{2}$$

$$J_k = J_k^{LE} = \sum_{i \neq k}^{G} H_i V_i V_i^H H_i^H + K_z + K_Q, \tag{3}$$

with $K_z = \text{diag}(\sigma_i^2 I)$ and $K_Q = \text{diag}(K_{Q_i})$. To achieve higher throughput, a successive interference cancellation (SIC) scheme can be applied at the CP 130. In this case, the matrix $J_k^{LE}$ is replaced by $J_k^{SIC}$ expressed as:

$$J_k = J_k^{SIC} = \sum_{i > k}^{G} H_i V_i V_i^H H_i^H + \sigma_i^2 I + K_Q. \tag{4}$$

The compression rates at the BSs 120 should satisfy the fronthaul link capacity constraints. Based on the vector quantization theory, the fronthaul constraints can be expressed as:

$$\log \frac{\left| \sum_{k=1}^{G} H_{ik} V_k V_k^H H_{ik}^H + \sigma_i^2 I + K_{Q_i} \right|}{|K_{Q_i}|} \leq C_i \text{ for } i = 1, 2, \ldots, L, \tag{5}$$

where $H_{ik}$ is the complex channel gain matrix between the k-th UE 110 and the i-th BS 120.

The following weighted sum-rate maximization problem is formulated to characterize the tradeoff between the achievable rates for the UEs 110 and the system resources:

$$\max_{V_k, K_{Q_i}} \sum_{k=1}^{G} \alpha_k \log |I + V_k^H H_k^H J_k^{-1} H_k V_k| \tag{6}$$

s.t. $J_k = \sum_{i \neq k} H_i V_i V_i^H H_i^H + K_z + K_Q,$ $$\log \frac{\left|\sum_{k=1}^{G} H_{ik} V_k V_k^H H_{ik}^H + \sigma_i^2 I + K_{Q_i}\right|}{|K_{Q_i}|} \leq C_i, \text{ and}$$

$K_{Q_i} \succeq 0,$ for $i = 1, 2, \ldots, L,$ $Tr(V_k V_k^H) \leq P_k,$ for $k = 1, 2, \ldots, G,$ where $\alpha_k$'s are the weights representing the priorities associated with the UEs 110, $K_z = \text{diag}(\sigma_i^2 I)$, and $K_Q = \text{diag}(K_{Q_i})$.

Due to the non-convexity of both the objective function and the fronthaul capacity constraints in the problem formulation of equation (6), finding the global optimum solution of equation (6) can be complex. The present formulation of equation (6) can be extended to a more general case where the UE 110 scheduling strategy is also included. More specifically, a weighted sum rate over all the UEs 110 in the network can be considered, where the beamformer vector for the UEs 110 are set to a zero vector if they are not scheduled.

In an embodiment, a joint optimization of a beamformer vector and a quantization noise covariance matrix is applied to account for both the transmit beamforming, from the UEs 110 to the BSs 120, and the quantization for compression at the BSs 120. A weighted minimum-mean-square-error successive convex approximation (WMMSE-SCA) algorithm is used for efficiently finding a local optimum solution to this weighted sum rate maximization problem.

The WMMSE-SCA algorithm is used to find a stationary point of the problem formulation of equation (6). The objective function and fronthaul capacity constraints in this model are both non-convex functions with respect to the optimization variables. Solving the model can be challenging due to the complexity of the equations involved. To simplify the solution, the objective function in equation (6) is reformulated as a convex function with respect to the MMSE-matrix, given by the UE's target signal $s_k$ and the intended decoded signal $\hat{s}_k$ when a MMSE receive beamformer is applied. The convex objective function and the compression rate expressions in the fronthaul constraints of equation (6) are then linearized to obtain a convex approximation of the original problem. The optimal solution is approximated by optimizing this convex approximation.

The following relation is a consequence of concavity of the log $|\cdot|$ function in equation (6):

$\log |\Omega| \leq \log |\Sigma| + Tr(\Sigma^{-1}\Omega) - N$ with equality if and only if $\Omega = \Sigma,$ (7)

for the positive definite Hermitian matrices $\Omega, \Sigma \in C^{N \times N}$. By applying this relation to the first log-determinant term in the fronthaul constraint of equation (5) and by setting $$\Omega = \sum_{k=1}^{G} H_{ik} V_k V_k^H H_{ik}^H + \sigma_i^2 I + K_{Q_i},$$

it becomes possible to approximate the fronthaul constraint of equation (5) with the following convex constraint:

$$\log|\Sigma_i| + Tr\left(\Sigma_i^{-1}\left(\sum_{k=1}^{G} H_{ik} V_k V_k^H H_{ik}^H + \sigma_i^2 I + K_{Q_i}\right)\right) - \log|K_{Q_i}| \leq C_i + N \quad (8)$$

for $i = 1, 2, \ldots, L.$

The original fronthaul constraint of equation (5) may be feasible when the convex constraint of equation (8) is feasible. The two constraints are equivalent when $$\Sigma_i^* = \sum_{k=1}^{G} H_{ik} V_k V_k^H H_{ik}^H + \sigma_i^2 I + K_{Q_i}. \quad (9)$$

The objective function in equation (6) can be approximated using the WMMSE approximation considering $U_k \in C^{NL \times d}$ as the linear receive beamformer applied at the CP 130 for recovering $s_k$. The transmission rate $R_k$ in equation (2) can be expressed as:

$$R_k = \max_{U_k} \log|E_k^{-1}|, \text{ where} \quad (10)$$

$$E_k = (1 - U_k^H H_k V_k)(1 - U_k^H H_k V_k)^H +$$

$$U_k^H \left(\sum_{j \neq k}^{G} H_j v_j V_j^H H_j^H + K_z + K_Q\right) U_k.$$

By applying the relation above, the rate expression in equation (10) can be rewritten as:

$$R_k = \max_{W_k, U_k} (\log|W_k| - Tr(W_k E_k) + d), \text{ where} \quad (11)$$

$W_k$ is the weight matrix introduced by the WMMSE approach. The optimal $W_k$ is thus given by:

$W^*_k = E_k^{-1} = (I + (U^*_k)^H H_k V_k)^{-1},$ (12)

where $U^*_k$ is the MMSE receive beamformer given by:

$$U_k^* = \left(\sum_{i \neq k} H_i V_i V_i^H H_i^H + K_z + K_Q\right)^{-1} H_k V_k. \quad (13)$$

Using equations (11) and (8) to replace the objective function and the fronthaul constraint in equation (6), it is possible to reformulate the weighted sum-rate maximization problem as follows:

$$\max_{\substack{V_k, K_{Q_i}, U_k, \\ W_k, \Sigma_i}} \sum_{k=1}^{G} \alpha_k (\log|W_k| - Tr(W_k E_k)) + \rho \sum_{i=1}^{L} \|\Sigma_i - \Omega_i\|_F^2 \quad (14)$$

s.t. $\log |\Sigma_i| Tr(\Sigma_i^{-1}\Omega_i) - \log |K_{Q_i}| \leq C'_i,$ $K_{Q_i} \succeq 0,$ for $i=1, 2, \ldots, L,$ $Tr(V_k V_k^H) \leq P_k,$ for $k=1, 2, \ldots, G,$ where $\sigma$ is some positive constant, $C'_i = C_i + N,$ and $\Omega_i = \sum_{k=1}^{G} H_{ik} V_k V_k^H H_{ik}^H + \sigma_i^2 I + K_{Q_i}.$ The last term in the objective function of equation (14), which involves a summation of Frobenius norms, is a quadratic regularization term that establishes a strongly convex optimization with respect to each optimization variable.

The problem can be verified to be convex with respect to any one of the optimization variables when the other optimization variables are fixed. Specifically, when the other variables are fixed, the optimal values of $\Sigma_i$, $W_k$, and $U_k$ are given by equations (9), (12), and (13) respectively. When $\Sigma_i$, $U_k$, and $W_k$ are fixed, the optimal values of $V_k$ and $K_{Q_i}$ are the solution of the following optimization problem:

$$\min_{V_k, K_{Q_i}} \sum_{k=1}^{G} \alpha_k Tr(W_k E_k) + \rho \sum_{i=1}^{L} \|\Omega_i - \Sigma_i\|_F^2 \quad (15)$$

$$s.t. \; Tr(\Sigma_i^{-1}\Omega_i) - \log |K_{Q_i}| \leq C'_i - \log |\Sigma_i|, \; K_{Q_i} \geq 0, \text{ for } i=1, 2, \ldots, L, \; Tr(V_k V_k^H) \leq P_k,$$

for $k=1, 2, \ldots, G$. The above problem is convex over $V_k$ and $K_{Q_i}$, which can be solved efficiently with polynomial complexity.

Figure 2:
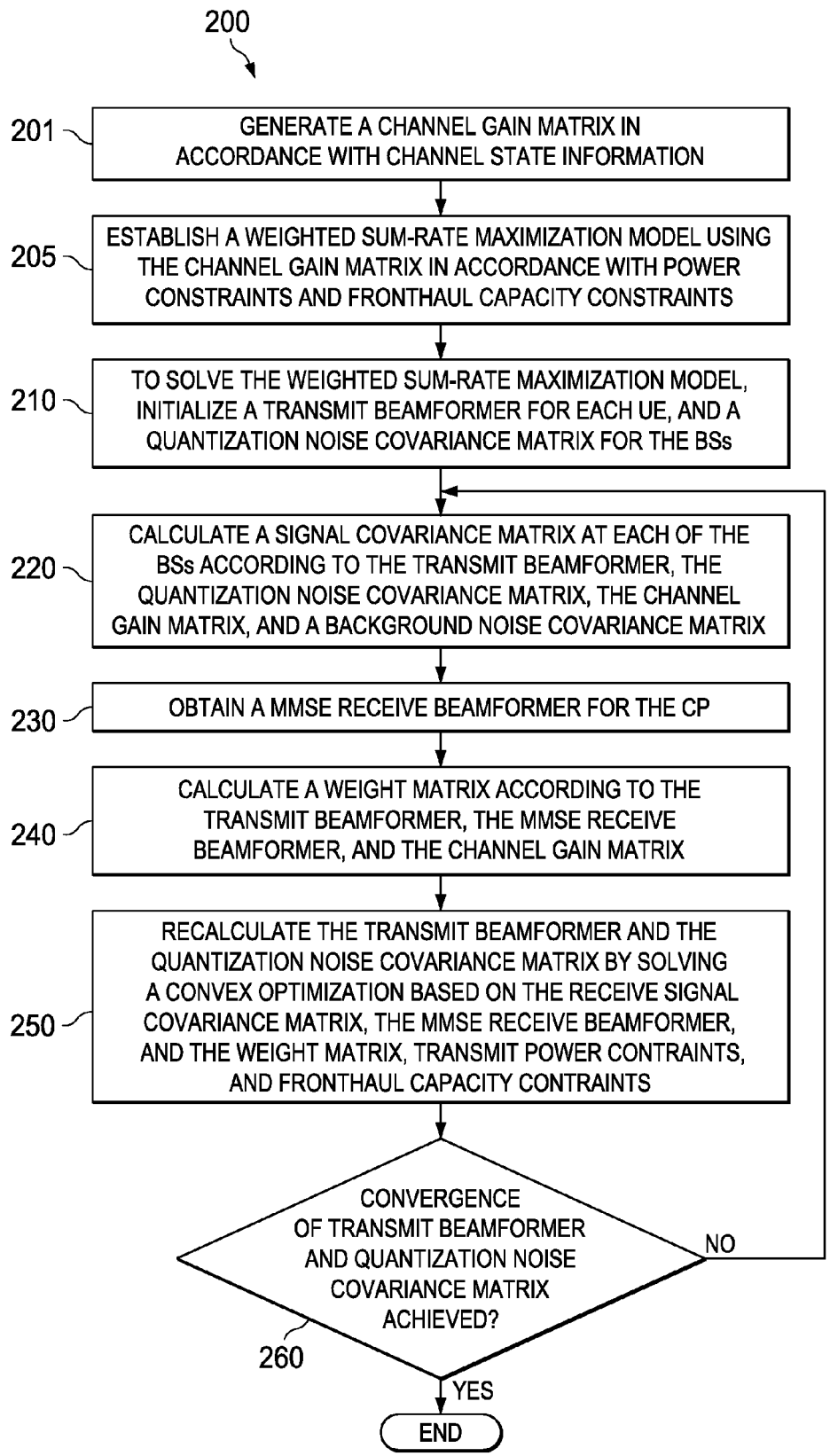
FIG. 2 illustrates an embodiment of a first method for optimizing beamforming and compression in C-RAN MIMO communications.

FIG. 2 shows an embodiment method 200 for optimizing beamforming and compression in MIMO C-RAN communications. The method summarizes the steps of the WMMSE-SCA algorithm which can be implemented at the CP. At step 201, a channel gain matrix is generated in accordance with channel state information for uplink transmissions from the UEs to the BSs. At step 205, a weighted sum-rate maximization model is established using the channel gain matrix in accordance with power constraints and fronthaul capacity constraints. The solution to the weighted sum-rate maximization model begins at step 210, where a transmit beamformer (beamforming vector), for each UE to transmit on uplink to all considered BSs, is initialized. A quantization noise covariance matrix is also initialized for the BSs. The quantization noise covariance matrix determines the quantization of receive signals at the BSs. For example, the transmit beamformer $V_k$ is initialized as $Tr(V_k V_k^H) = P_k$ to meet the power constraints. The quantization noise covariance matrix can be initialized to the mean noise, as $K_{Q_i} = \gamma I$. At step 220, the receive signal covariance matrix for each BS is calculated according to the transmit beamformer, the quantization noise covariance matrix, the channel gain matrix, and a background noise covariance matrix of the system. For example, the receive beamformer $\Sigma_i$ is obtained as $\Sigma_i \leftarrow \Sigma_{k=1}^{G} H_{ik} V_k V_k^H H_{ik}^H + \sigma_i^2 I + K_{Q_i}$. At step 230, a MMSE receive beamformer for the CP is obtained based on the transmit beamformer, the quantization noise covariance matrix, the channel gain matrix, and the background noise covariance matrix. For example, the MMSE receive beamformer $U_k$ is obtained as: $U_k \leftarrow (\Sigma_{i \neq k} H_i V_i V_i^H H_i^H + K_z + K_Q)^{-1} H_k V_k$. At step 240, a weigh matrix is calculated according to the transmit beamformer, the MMSE receive beamformer, and the channel gain matrix. For example, the weight matrix $W_k$ is retrieved using $W_k \leftarrow (I + U_k^H H_k V_k)^{-1}$. At step 250, the transmit beamformer and the quantization noise covariance matrix are recalculated by solving a convex optimization based on the receive signal covariance matrix, the MMSE receive beamformer, the weight matrix, the transmit power constraints for the UE, and the fronthaul links capacity constraints. The resulting vectors $(V_k, K_{Q_i})$ are chosen as a first solution. The steps 220 to 250 can be repeated until the solution converges to final values. Convergence, in this case, is not a reference to the value of $V_k$ converging to the value of $K_{Q_i}$, but instead refers to the difference between the values of $V_k$ and $K_{Q_i}$ in a given iteration being sufficiently close to the respective values in a previous iteration. In some embodiments, if the difference between the values of $V_k$ and $K_{Q_i}$ at a given iteration and the respective values at a previous iteration is below a threshold, then convergence is considered to have been achieved.

The WMMSE-SCA algorithm above yields a non-decreasing sequence of objective values for the problem of equation (6). In some scenarios, this may guarantee that the algorithm will converge to a stationary point of the optimization problem. From any initial point $(V_k^{(0)}, K_{Q_i}^{(0)})$, the convergence result represents the limit point $(V^*_k, K^*_{Q_i})$ generated by the WMMSE-SCA. This point is a stationary point of the weighted sum-rate maximization problem of equation (6).

Although locally optimal transmit beamformers and quantization noise covariance matrices can be found using the WMMSE-SCA algorithm for any fixed user schedule, user priority, and channel condition, the implementation of WMMSE-SCA in practice can be computationally intensive, especially when the channels are fast varying or when the scheduled users in the time-frequency slots change frequently. In another embodiment, a low-complexity approximation scheme, which can be simpler than the WMMSE-SCA scheme above, is applied to account for both the transmit beamforming, from the UEs 110 to the BSs 120, and the quantization for compression at the BSs 120. The low-complexity approximation scheme matches the transmit beamformers to the strongest channel signal vector. Separately, the scheme also determines per-antenna scalar quantizers with uniform quantization noise levels across the antennas at each BS 120 for the sum-rate maximization problem when the signal-to-quantization-noise ratio (SQNR) is relatively high (e.g., above a determined threshold) and when successive interference cancelation (SIC) is applied at the CP 130. Unlike the WMMSE-SCA scheme, this low-complexity scheme designs the transmit beamforming and the backhaul compression separately. Numerical simulations show that with SIC at the CP 130, the proposed separate design is near optimal in the SQNR regime of practical interest. The solution is efficient and practical for designing transmit beamforming and backhaul compression to mitigate inter-cell interference in the C-RAN system.

The sum-rate maximization problem can be formulated as follow:

$$\max_{K_{x_j}, K_{Q_i}} \log \frac{|HK_X H^H + K_z + K_Q|}{|K_z + K_Q|} \quad (16)$$

$$s.t. \; \log \frac{|G_i K_X G_i^H + \sigma_i^2 I + K_{Q_i}|}{|K_{Q_i}|} \leq C_i K_{Q_i} \geq 0,$$

for $i=1, 2, \ldots, L$, $Tr(K_{x_j}) \leq P_j$, for $j=1, 2, \ldots, G$, where $K_z = \text{diag}(\sigma_i^2 I)$, and $K_Q = \text{diag}(K_{Q_i})$. The matrix H is the channel gain matrix between the UEs 110 and the BSs 120, and $G_i$ denotes the channel gain matrix between the UEs 110 and the i-th BS 120 (which may be full rank). The vector $K_{x_j} = V_j V_j^H$, and $K_X = \text{diag}(K_{x_j})$.

Under high SQNR, the optimal quantization noise levels should be set as uniform across the antennas at each BS 120. To obtain the Karush-Kuhn-Tucker (KKT) condition for the optimization problem in equation (16) under the high SQNR, a Lagrangian function is formed as:

$$L(K_{x_j}, K_{Q_i}, \lambda_i, \mu_j) = \log|HK_X H^H + K_z + K_Q| - \quad (17)$$

$$\log|K_z + K_Q| - \sum_{i=1}^{L} \lambda_i \log|G_i K_X G_i^H + \sigma_i^2 I + K_{Q_i}| +$$

$$\sum_{i=1}^{L} \lambda_i \log|K_{Q_i}| - \sum_{j=1}^{G} \mu_j Tr(K_{x_j}),$$

where $\lambda_i$ is the Lagrangian dual variable associated with the i-th backhaul constraint, and $\mu_j$ is the Lagrangian multiplier for the j-th transmit power constraint. Setting $\partial L/\partial K_{Q_i}$ to zero, the following optimality condition is obtained:

$$F_i(HK_XH^H+K_z+K_Q)^{-1}F_i^T-(\sigma_i^2I+K_{Q_i})^{-1}-\lambda_1(G_iK_XG_i^H+\sigma_i^2I+K_{Q_i})^{-1}+\lambda_iK_{Q_i}^{-1}=0, \quad (18)$$

where the N×NL matrix $F_i=[0, \ldots, 0, I_N, 0, \ldots, 0]$. It can be verified that $0 \leq \lambda_i < 1$. Furthermore, if the overall system is to operate at reasonably high spectral efficiency, the following inequality should hold: $(HK_XH^H+K_z+K_Q) \gg (K_z+K_Q)$ and $(G_iK_XG_i^H+\sigma_i^2I+K_{Q_i}) \gg K_{Q_i}$. Under this high SQNR condition, the equality $(\sigma_i^2I+K_{Q_i})^{-1}=\lambda_iK_{Q_i}^{-1}$ is provided, in which case the optimality condition becomes:

$$K_{Q_i} \approx \frac{\lambda_i}{1-\lambda_i}\sigma_i^2 I, \quad (19)$$

where $\lambda \in (0,1)$ is chosen to satisfy the fronthaul capacity constraints. The above result implies that uniform quantization noise levels across the antennas at each BS 120 are optimal at high SQNR, although the quantization noise level may differ from BS to BS depending on the background noise levels and the fronthaul constraints.

For maximizing the sum rate, each UE 110 can align its signaling direction with the strongest eigen-mode of the effective channel, and allocate power along this direction in a water-filling procedure. To implement water-filling, the combined quantization and background noise and interference is whitened. The resulting channel is then diagonalized to find its eigenmodes. The water-filling procedure is performed as such iteratively among the MDs 110. As seen from equation (19), at high SQNR, the optimal quantization noise covariance matrices are diagonal with entries proportional to the background noise levels. Further, if d=min {M, NL/G} is selected, e.g., if the total number of user data streams is permitted to be equal to the number of degrees of freedom in the system, then multi-user interference would be contained. In this case it is reasonable for each UE 110 to transmit with maximum power and allocate the transmit power uniformly among the transmit beamformers.

Accordingly, the low-complexity beamformer design selects for each UE 110 the transmit beamformers that match to the UE's transmit channel. Specifically, a singular value decomposition (SVD) on $H_k$ is performed for the k-th UE 110 as $H_k=\Phi C_k\Gamma_k\Psi_k^H$. The transmit beamformer is then chosen as:

$$V_k = \sqrt{\frac{P_k}{d}}\Psi_k(1:d), \quad (20)$$

where $\Psi_k(1:d)$ is a matrix formed by d columns of $\Psi_k$ which correspond the d largest singular values of $H_k$. Simulation results show that with SIC at the CP 130, this scheme performs close to the WMMSE-SCA scheme in the SQNR regime of practical interest.

Figure 3:
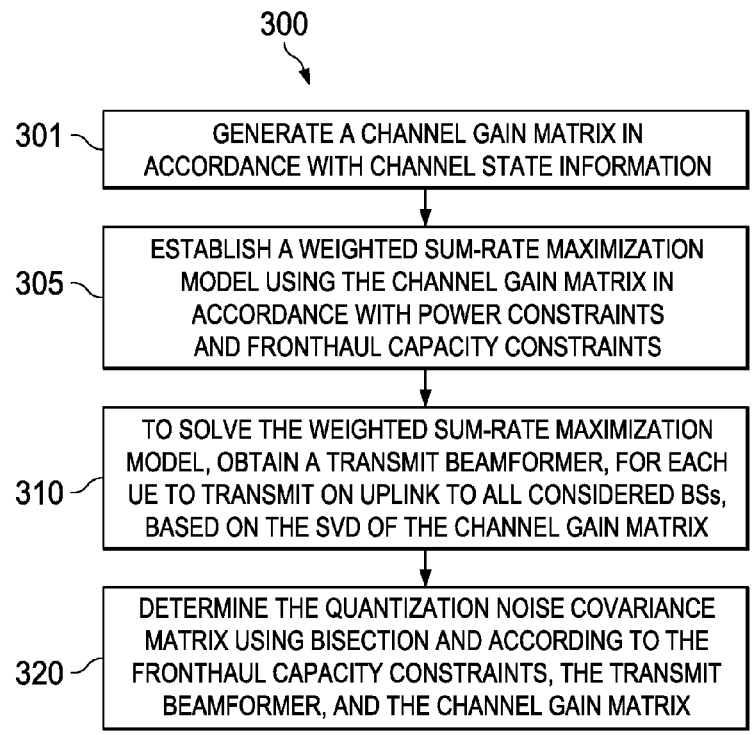
FIG. 3 illustrates an embodiment of a first method for optimizing beamforming and compression in C-RAN MIMO communications.

FIG. 3 shows an embodiment of another method 300 for optimizing beamforming and compression in C-RAN MIMO communications. The method summarizes the steps of the low-complexity approximation which can be implemented at the CP. At step 301, a channel gain matrix is generated in accordance with channel state information for uplink transmissions from the UEs to the BSs. At step 305, a weighted sum-rate maximization model is established using the channel gain matrix in accordance with power constraints and fronthaul capacity constraints. The solution to the weighted sum-rate maximization model begins at step 310, where a transmit beamformer, for each UE to transmit on uplink to all considered BSs, is obtained based on the SVD of the channel gain matrix. For instance, the SVD is performed on $H_k$, e.g., using $H_k=\Phi_k\Gamma_k\Psi_k^H$. The vector $V_k$ is then obtained as $$V_k = \sqrt{\frac{P_k}{d}}\Psi_k(1:d)$$

for k=1, . . . , G. At step 320, the quantization noise covariance matrix is determined using bisection and according to the fronthaul capacity constraints, the transmit beamformer, and the channel gain matrix. For instance, bisection in $[\beta_{min}, \beta_{max}]$ can be used to solve for $\beta_i$ in $C(\beta_i)=C_i$, for i=1, . . . , L. The vector $K_{Q_i}$ is then obtained as $K_{Q_i}=\beta_iI$ for i=1, . . . , L.

Simulation studies were performed to evaluate the two schemes for optimizing the beamforming of uplink MIMO transmissions from the UEs to the BSs and the compression of received signals at the BSs. The simulations were considered for a 19-cell 3-sector/cell wireless network setup with central 7 cells forming a cooperating cluster. The UEs are associated with the strongest BS. Round-robin user scheduling was used on a per-sector basis. Detailed system parameters are outlined in Table 1 below. In particular, the C-RAN consists of L=21 sectors, with M=N=2 antennas at each BS and each UE. A total of G=NL UEs are scheduled simultaneously in each time-frequency slot, where each UE sends one data stream (e.g., d=1) to the CP.

TABLE 1

| Cellular Layout | Hexagonal, 19-cell, 3 sectors/cell |
| --- | --- |
| BS-to-BS Distance | 500 m |
| Frequency Reuse | 1 |
| Channel Bandwidth | 10 MHz |
| Number of Users per Sector | 20 |
| Total Number of Users | 420 |
| Max Transmit Power | 23 dBm |
| Antenna Gain | 14 dBi |
| Background Noise | −169 dBm/Hz |
| Noise Figure | 7 dB |
| Tx/Rx Antenna No. | 2 × 2 |
| Distance-dependent Path Loss | 128.1 + 37.6log$_{10}$ (d) |
| Log-normal Shadowing | 8 dB standard deviation |
| Shadow Fading Correlation | 0.5 |
| Cluster Size | 7 cells (21 sectors) |
| Scheduling Strategy | Round-robin |

Figure 4:
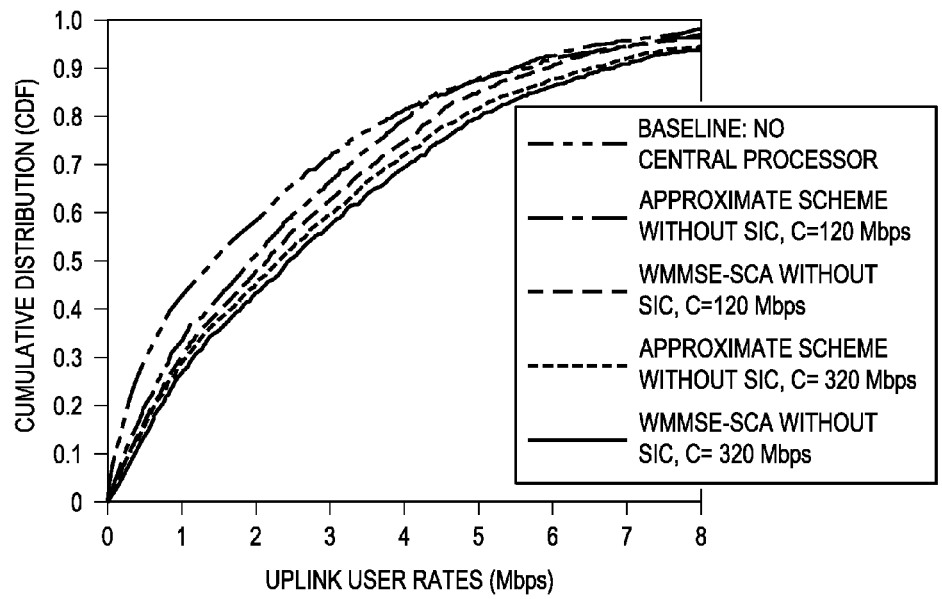
FIG. 4 is a graph showing the cumulative distribution of user rates from simulation studies using embodiment schemes without successive interference cancellation (SIC)
Figure 5:
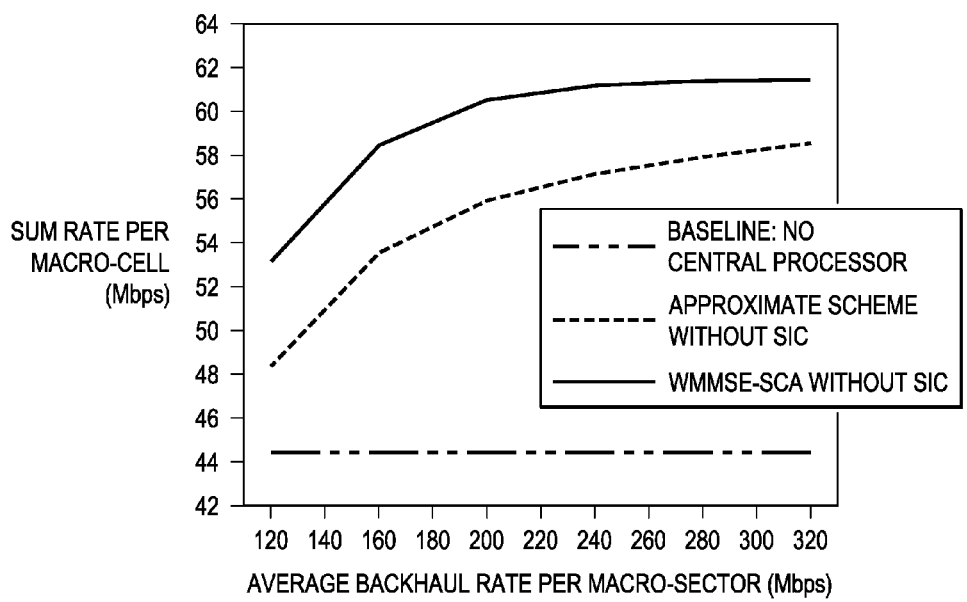
FIG. 5 is a graph showing the per-cell sum rate from simulation studies using embodiment schemes without SIC.

FIG. 4 shows the cumulative distribution of user rates obtained from simulation studies without SIC at the CP. FIG. 5 shows, from the simulations, the per-cell sum rate vs. the average per-sector fronthaul capacity for both the WMMSE-SCA and approximation schemes, without SIC. FIGS. 4 and 5 compare the performance of the baseline system with the proposed beamforming and backhaul compression schemes implemented without SIC at the CP. The results show that both the WMMSE-SCA and approximation schemes significantly outperform the baseline scheme without multi-cell processing. The results also show that the WMMSE-SCA scheme outperforms the approximation scheme when SIC is not implemented. As the fronthaul capacity increases, the performance gap between the two schemes is reduced.

However, as shown in FIG. 5, such a gap does not vanish even in the high SQNR regime.

Figure 6:
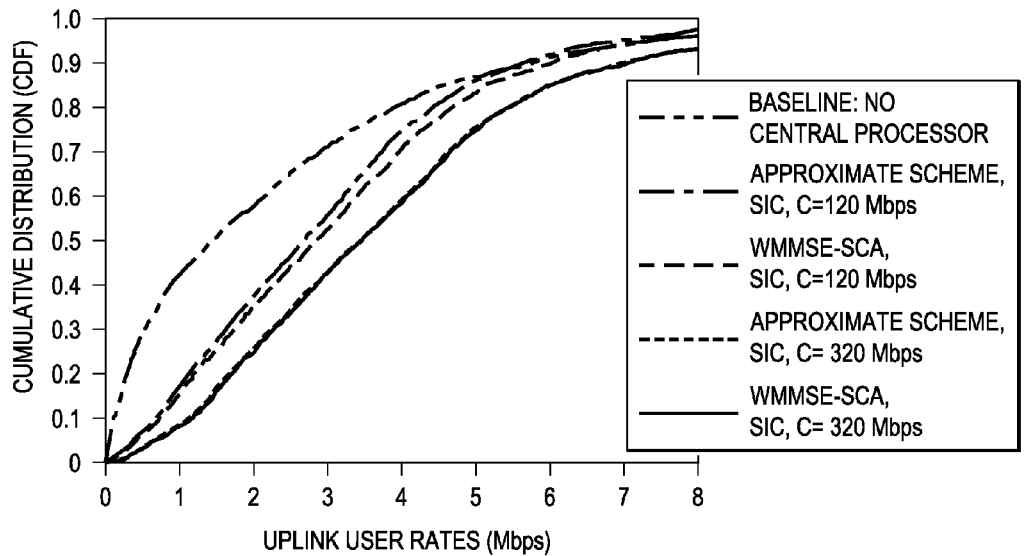
FIG. 6 is a graph showing the cumulative distribution of user rates from simulation studies using embodiment schemes with SIC.
Figure 7:
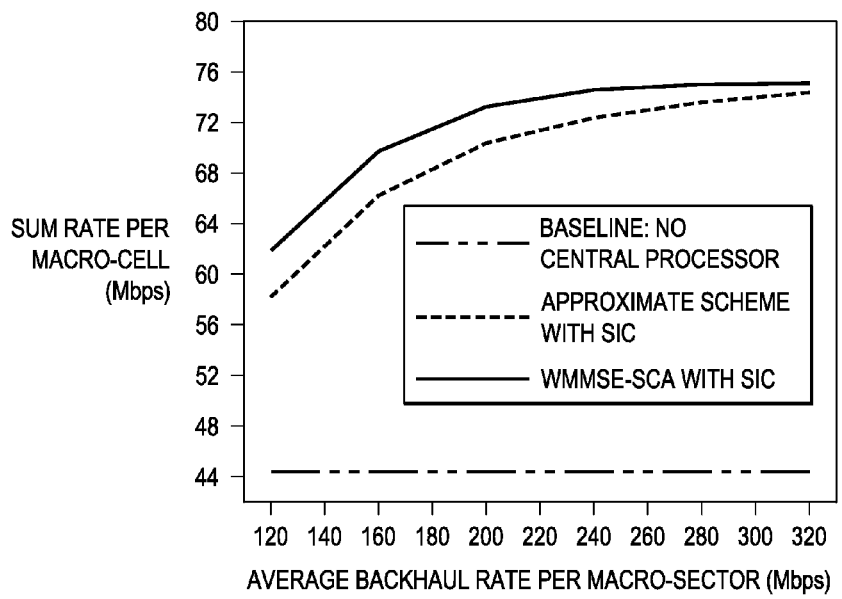
FIG. 7 is a graph showing the per-cell sum rate from simulation studies using embodiment schemes with SIC.

FIG. 6 shows the cumulative distribution of user rates obtained from simulation studies with SIC at the CP. FIG. 7 shows, from the simulations, the per-cell sum rate vs. the average per-sector fronthaul capacity for the WMMSE-SCA and approximation schemes with SIC. FIGS. 6 and 7 show the performance of the two schemes with SIC at the CP. In comparison to the simulations above without SIC, the WMMSE-SCA and approximation schemes can achieve more improvement in overall performance when the SIC is applied. The performance improvement is more significant for the UEs with low rates (e.g., 10% of the UEs), as shown in FIG. 6. The approximation scheme performs close to the WMMSE-SCA scheme when fronthaul capacity is large. When the fronthaul capacity goes to infinity, the gap in performance between the two proposed schemes may vanish.

Figure 8:
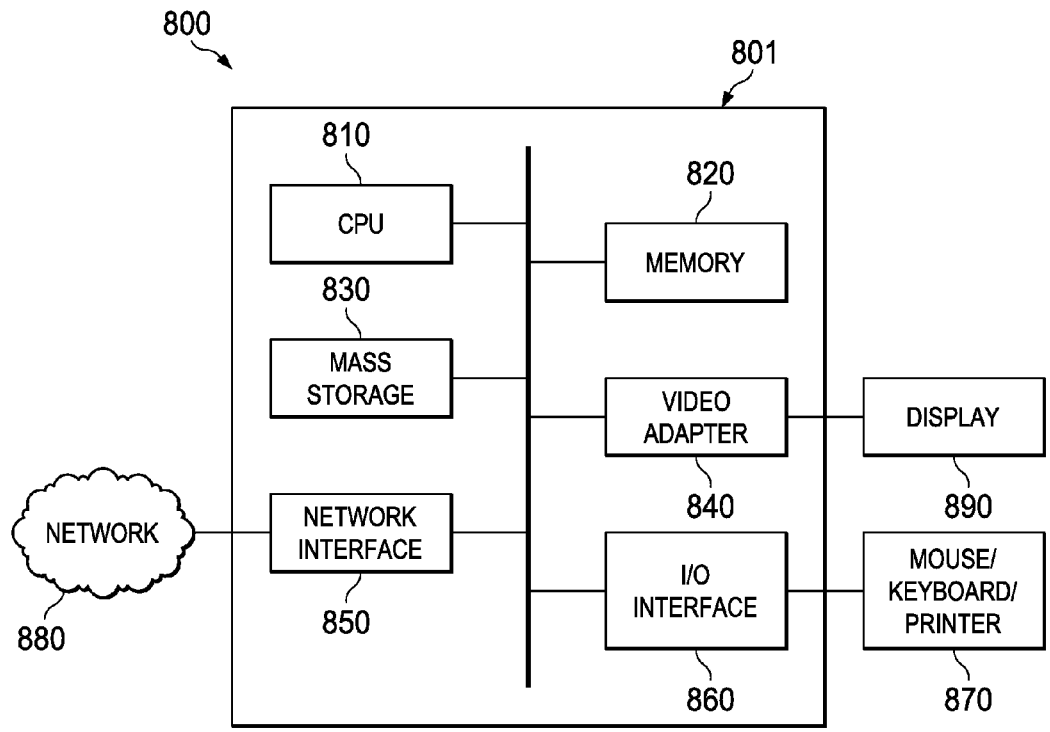
FIG. 8 is a diagram of a processing system that can be used to implement various embodiments.

FIG. 8 is a block diagram of a processing system 800 that can be used to implement various embodiments. For instance the processing system 800 can be part of a network entity or component such as a CP, a base station, or a WiFi access point. The system can also be part of a UE, such as a smart phone, tablet computer, a laptop, or a desktop computer. The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The presented examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for determining a transmit beamformer and quantization noise covariance matrix for uplink multiple-input-multiple-output (MIMO) communications in a cloud radio access network (C-RAN), the method comprising:
   obtaining, by a central processor (CP), channel state information associated with a mobile device (MD) being served by a plurality of access points (APs) in the C-RAN;
   generating a channel gain matrix in accordance with the channel state information;
   establishing a weighted sum-rate maximization model using the channel gain matrix in accordance with power constraints of transmission from the MD to the APs, and capacity constraints of fronthaul links for compressed transmission of received MD signals from the APs to the CP; and
   jointly calculating a transmit beamforming vector for the MD and a quantization noise covariance matrix for the APs by applying a weighted minimum-mean-square-error successive convex approximation (WMMSE-SCA) algorithm to solve the weighted sum-rate maximization model.

2. The method of claim 1, wherein applying the WMMSE-SCA algorithm to solve the weighted sum-rate maximization model includes:
   initializing a transmit beamforming vector for the MD, and a quantization noise covariance matrix for the APs;
   calculating a receive signal covariance matrix for each of the APs according to the transmit beamforming vector, the quantization noise covariance matrix, the channel gain matrix, and a background noise covariance matrix;

obtaining a minimum-mean-squared-error (MMSE) receive beamforming vector for the CP based on the transmit beamforming vector, the quantization noise covariance matrix, the channel gain matrix, and the background noise covariance matrix;

calculating a weight matrix according to the transmit beamforming vector, the MMSE receive beamforming vector, and the channel gain matrix; and recalculating the transmit beamforming vector and the quantization noise covariance matrix by solving a convex optimization model based on the receive signal covariance matrix, the MMSE receive beamforming vector, the weight matrix, the power constraints, and the capacity constraints.

3. The method of claim 2 further comprising repeating calculating the weight matrix and recalculating the transmit beamforming vector and the quantization noise covariance matrix until the transmit beamforming vector and the quantization noise covariance matrix converge in value.

4. The method of claim 1 further comprising:
sending the quantization noise covariance matrix from the CP to the APs; and
sending the transmit beamforming vector to the MD.

5. A method for determining a transmit beamformer and a quantization noise covariance matrix for uplink multiple-input-multiple-output (MIMO) communications in a cloud radio access network (C-RAN), the method comprising:

obtaining, by a central processor (CP), channel state information for a mobile device (MD) being served by a plurality of access points (APs) in the C-RAN;

generating a channel gain matrix in accordance with the channel state information;

establishing a weighted sum-rate maximization model using the channel gain matrix in accordance with power constraints of transmission from the MD to the APs, and capacity constraints of fronthaul links for compressed transmission of received MD signals from the APs to the CP; and separately calculating a transmit beamforming vector for the MD and a quantization noise covariance matrix for the APs by applying an approximation algorithm to solve the weighted sum-rate maximization model.

6. The method of claim 5, wherein applying the approximation algorithm to solve the weighted sum-rate maximization model includes:

obtaining a transmit beamforming vector for the MD by applying a singular value decomposition of the channel gain matrix;

establishing a relation between quantization noise and the capacity constraints of the fronthaul links, wherein the relation is a function of the transmit beamforming vector and the channel gain matrix; and determining the quantization noise covariance matrix by applying bisection to the established relation.

7. The method of claim 5, wherein calculating the transmit beamforming vector includes matching the transmit beamforming vectors to a strongest channel signal vector.

8. The method of claim 5, wherein calculating the quantization noise covariance matrix includes determining per each antenna at each AP a scalar quantizer with uniform quantization noise levels across all antennas of the AP.

9. The method of claim 5 further comprising applying successive interference cancelation (SIC) at the CP.

10. The method of claim 5, wherein the transmit beamforming vector is calculated for transmitting signals above a defined signal-to-quantization-noise ratio (SQNR).

11. The method of claim 5 further comprising:
sending the quantization noise covariance matrix from the CP to the APs; and
sending the transmit beamforming vector to the MD.

12. A network component for determining a transmit beamformer and a quantization noise covariance matrix for uplink multiple-input-multiple-output (MIMO) communications in a cloud radio access network (C-RAN), the network component comprising:

a processor;
a non-transitory computer readable storage medium storing programming for execution by the processor, the programming including instructions to:

obtain channel state information for a mobile device (MD) being served by a plurality of access points (APs) in the C-RAN;

generate a channel gain matrix in accordance with the channel state information;

establish a weighted sum-rate maximization model using the channel gain matrix in accordance with power constraints of transmission from the MD to the APs, and capacity constraints of fronthaul links for compressed transmission of received MD signals from the APs to the network component; and jointly calculate a transmit beamforming vector for the MD and a quantization noise covariance matrix for the APs by applying a weighted minimum-mean-square-error successive convex approximation (WMMSE-SCA) algorithm to solve the weighted sum-rate maximization model.

13. The network component of claim 12, wherein the instructions to apply the WMMSE-SCA algorithm include instructions to:

initialize a transmit beamforming vector for the MD, and a quantization noise covariance matrix for the APs;

calculate a receive signal covariance matrix for each of the APs according to the transmit beamforming vector, the quantization noise covariance matrix, the channel gain matrix, and a background noise covariance matrix;

obtain a minimum-mean-squared-error (MMSE) receive beamforming vector for the network component based on the transmit beamforming vector, the quantization noise covariance matrix, the channel gain matrix, and the background noise covariance matrix;

calculate a weight matrix according to the transmit beamforming vector, the MMSE receive beamforming vector, and the channel gain matrix; and recalculate the transmit beamforming vector and the quantization noise covariance matrix by solving a convex optimization model based on the receive signal covariance matrix, the MMSE receive beamforming vector, the weight matrix, the power constraints, and the capacity constraints.

14. The network component of claim 13, wherein the instructions to apply the WMMSE-SCA algorithm include further instructions to repeat calculating the weight matrix and recalculating the transmit beamforming vector and the quantization noise covariance matrix until the transmit beamforming vector and the quantization noise covariance matrix converge in value.

15. The network component of claim 12, wherein the programming includes further instructions to:

send the quantization noise covariance matrix from the network component to the APs; and send the transmit beamforming vector to the MD.

16. The network component of claim 12, wherein the network component is a cloud-computing based central processor (CP) located in a cloud computing environment.

17. The network component of claim 16, wherein the MD is a user equipment (UE).

18. The network component of claim 16, wherein the AP is a base station (BS).

19. A network component for determining a transmit beamformer and a quantization noise covariance matrix for uplink multiple-input-multiple-output (MIMO) communications in a cloud radio access network (C-RAN), the network component comprising:

a processor;

a non-transitory computer readable storage medium storing programming for execution by the processor, the programming including instructions to:

obtain channel state information for a mobile device (MD) being served by a plurality of access points (APs) in the C-RAN;

generate a channel gain matrix in accordance with the channel state information;

establish a weighted sum-rate maximization model using the channel gain matrix in accordance with power constraints of transmission from the MD to the APs, and capacity constraints of fronthaul links for compressed transmission of received MD signals from the APs to the network component; and separately calculating a transmit beamforming vector for the MD and a quantization noise covariance matrix for the APs by applying an approximation algorithm to solve the weighted sum-rate maximization model.

20. The network component of claim 19, wherein the instructions to apply the approximation algorithm include instructions to:

obtain a transmit beamforming vector for the MD by applying a singular value decomposition of the channel gain matrix;

establish a relation between quantization noise and the capacity constraints of the fronthaul links, wherein the relation is a function of the transmit beamforming vector and the channel gain matrix; and determine the quantization noise covariance matrix by applying bisection to the established relation.

21. The network component of claim 19, wherein the transmit beamforming vector is designed for signals above a defined signal-to-quantization-noise ratio (SQNR).

22. The network component of claim 19, wherein the network component is a cloud-computing based central processor (CP) located in a cloud computing environment.

* * * * *